(No Model.)　　　　　　　　　　　　　　　5 Sheets—Sheet 1.
E. F. STODDARD.
HARROW.

No. 347,530.　　　　　　　　　Patented Aug. 17, 1886.

Witnesses:
W. C. Jirdinston.
E. W. Rector

Inventor:
E. Fowler Stoddard
by Stem & Peck
his Attorneys.

(No Model.)  E. F. STODDARD.  5 Sheets—Sheet 3.

HARROW.

No. 347,530.  Patented Aug. 17, 1886.

Witnesses:
W. C. Jirdinston.
E. W. Rector

Inventor:
E. Fowler Stoddard
by Stem & Peck
his Attorneys.

(No Model.) 5 Sheets—Sheet 4.
E. F. STODDARD.
HARROW.

No. 347,530. Patented Aug. 17, 1886.

Witnesses:
W. C. Jirdinston.

Inventor:
E. Fowler Stoddard
by Skin & Peck
his Attorneys.

(No Model.) 5 Sheets—Sheet 5.

E. F. STODDARD.
HARROW.

No. 347,530. Patented Aug. 17, 1886.

Witnesses:
W. C. Tirdinston.
E. W. Rector

Inventor:
E. Fowler Stoddard
by Stein & Peck
his Attorneys.

UNITED STATES PATENT OFFICE.

E. FOWLER STODDARD, OF DAYTON, OHIO, ASSIGNOR TO THE STODDARD MANUFACTURING COMPANY, OF SAME PLACE.

HARROW.

SPECIFICATION forming part of Letters Patent No. 347,530, dated August 17, 1886.

Application filed August 11, 1885. Serial No. 174,111. (No model.)

*To all whom it may concern:*

Be it known that I, E. FOWLER STODDARD, a citizen of the United States, residing at Dayton, in the county of Montgomery and State of Ohio, have invented certain new and useful Improvements in Harrows, of which the following is a full, clear, and exact description, reference being had to the accompanying drawings, forming part of this specification.

My invention relates to that class of harrows or cultivators known as "rotary disk harrows," wherein the disk-gangs, in two sets, may be utilized as in-throwing gangs, either when occupying a straight line relatively to each other, or when angling forward or backward of the main beam or the position which the main beam in this class of harrows would occupy.

It has for its object the increased efficiency in this class of harrows, and, among other things, such a construction and adaptation of its parts as to equalize the draft-strain and prevent the bearing down of the pole upon the horses' necks, and the consequent throwing of the weight of the machine upon the same; also, the application of forwardly and rearwardly projecting adjacent inner cutter-disks, or either a forward or rearward cutter-disk, so arranged as to fully cut and and turn the earth at a point between the adjacent ends of the gangs, and at the same time prevent any banking or clogging at this point; also, in the application of automatically-shifting weights, so arranged and connected with the machine as that by the shifting of the gangs they will automatically so change their position as to balance the machine and relieve the horses' necks of the weight of the pole and downward pressure of the machine upon them; also, in other details of construction and arrangement of parts, all as will be herein set forth, and specifically pointed out in the claims.

Figure 1:
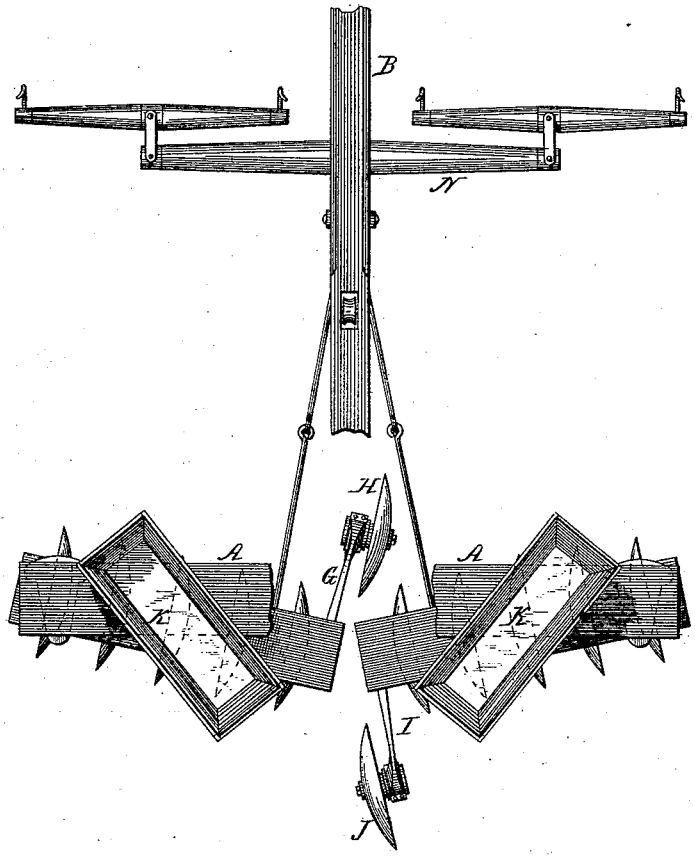
Figure 2:
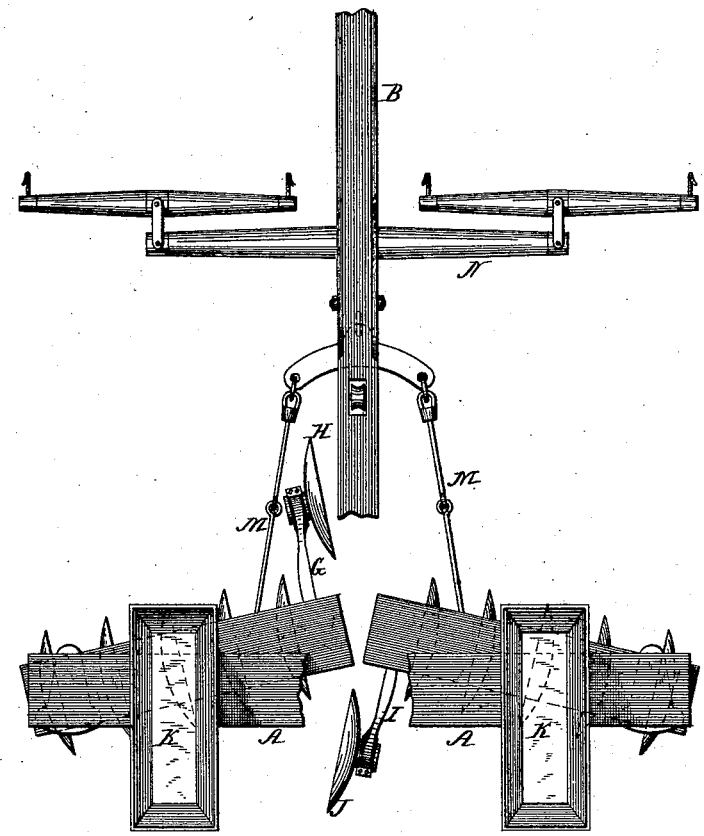
Figure 3:
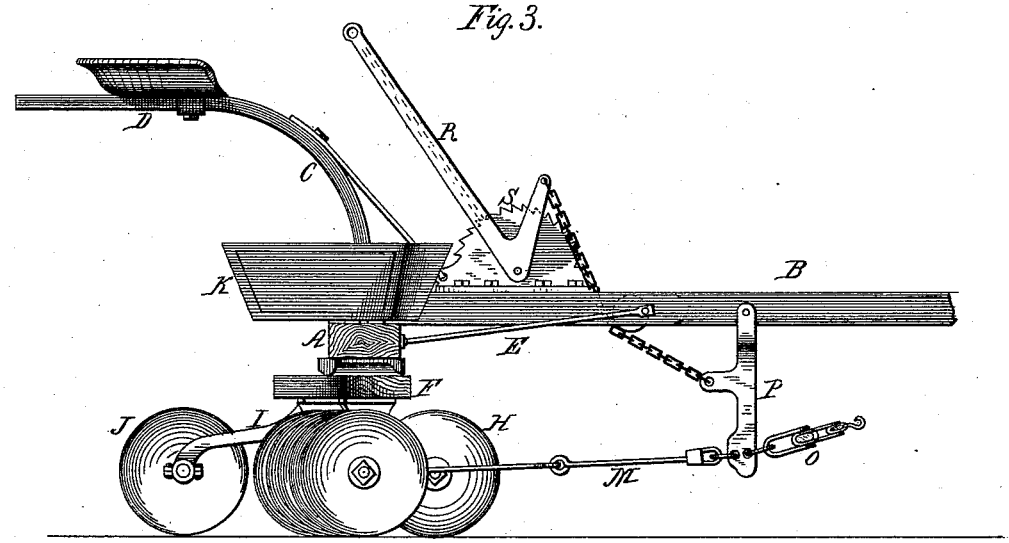
Figure 4:
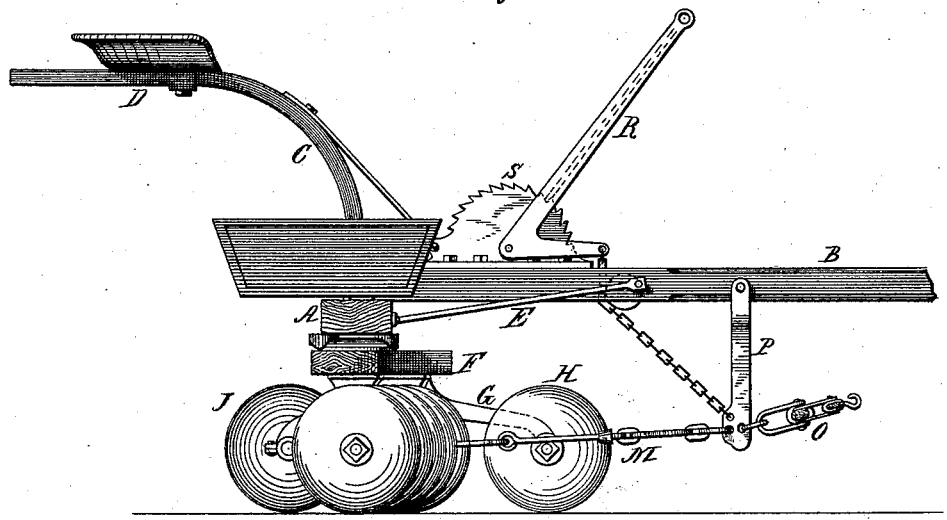
Figure 5:
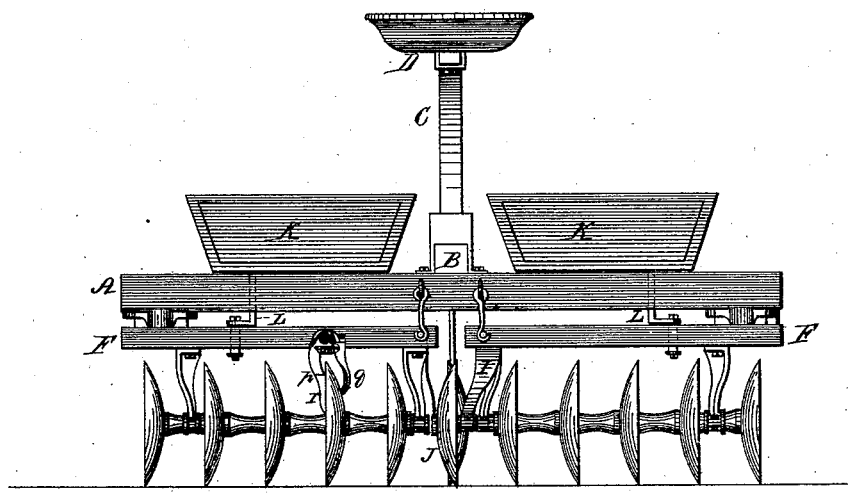
Figure 8:
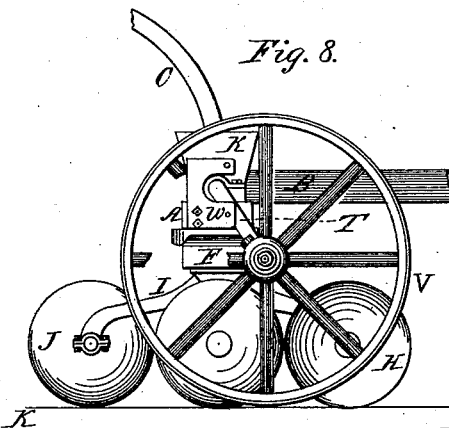
Figure 7:
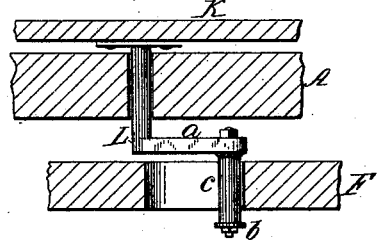
Figure 6:
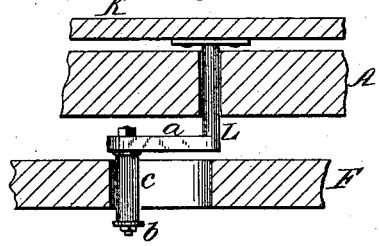
Figure 12:
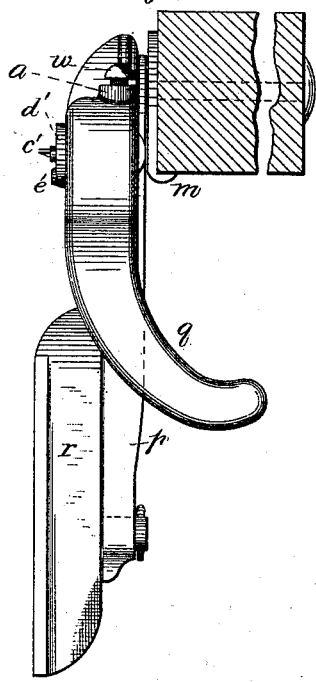
Figure 13:
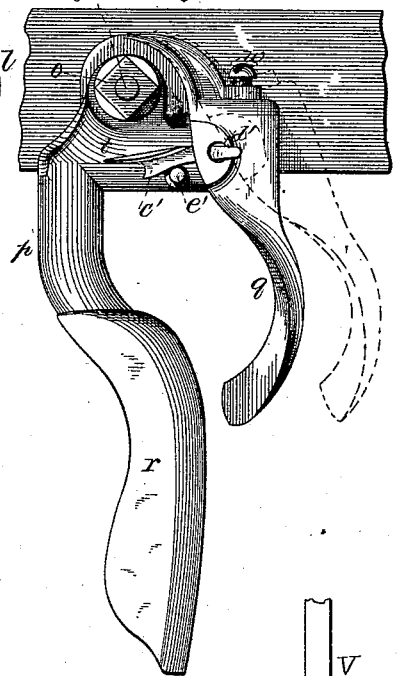
Figure 14:
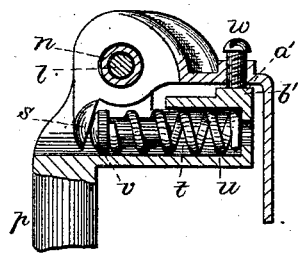
Figure 10:
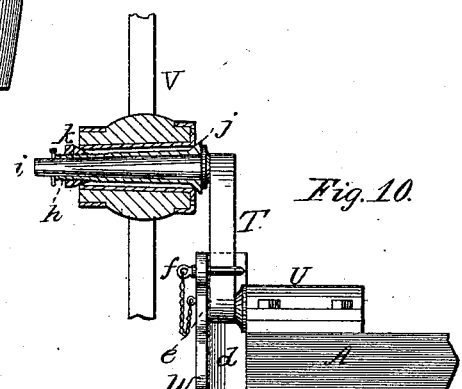
Figure 9:
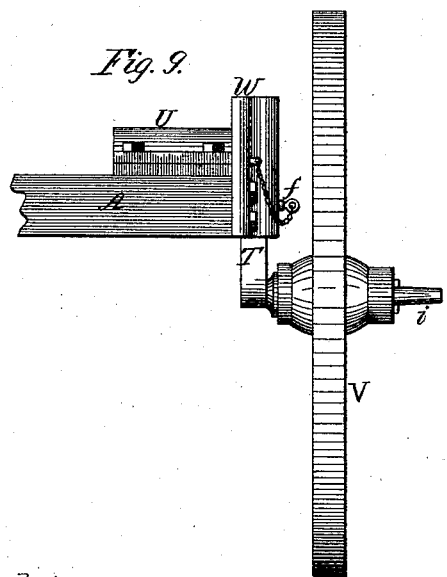
Figure 11:
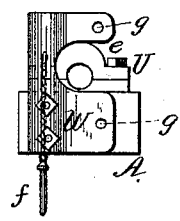

In the accompanying drawings, Figure 1, Sheet 1, is a plan view of my improved harrow with the gangs adjusted at a rearward angle, and with the disks arranged to constitute an out-throwing harrow. Fig. 2, Sheet 2, is a corresponding view with the gangs angled forward and with the disks arranged to constitute an in-throwing harrow. Fig. 3, Sheet 3, is a side elevation of Fig. 1. Fig. 4, Sheet 3, is a side elevation of Fig. 2. Fig. 5, Sheet 4, is a rear elevation of the harrow with the gang-beams lying in a straight line and with the disks arranged for an out-throwing harrow. Fig. 6, Sheet 4, is an enlarged detail sectional view of the weight-operating mechanism adjusted for an out-throwing harrow. Fig. 7, Sheet 4, is a corresponding view of the same parts adjusted for an in-throwing harrow. Fig. 8, Sheet 4, is a side elevation of so much of the harrow as is necessary to show the application of the removable carrying-wheels. Fig. 9, Sheet 5, is a rear elevation of one end of the main beams, showing the application of one of the removable carrying-wheels in position when it is desired to raise the disk-gangs from the ground, as in the act of transporting the harrow from place to place. Fig. 10, Sheet 5, is a corresponding view, partly in section and detail, of the front of one end of the main beam, showing the position of the parts when the harrow is at work and the carrying-wheels are lifted off the ground. Fig. 11, Sheet 5, is an end view of the main beam with the carrying-wheels and their crank-shaft removed. Fig. 12, Sheet 5, is an enlarged side elevation of my improved scraper. Fig. 13, Sheet 5, is an enlarged rear elevation of the same. Fig. 14, Sheet 5, is a sectional detail view of Fig. 13.

The same letters of reference are used to indicate indentical parts in all the figures.

The general construction of the harrow may be that shown and described in my Patent No. 312,772, dated February 24, 1885, with the exceptions hereinafter pointed out; and it will be only necessary to state that A is the main beam, B the tongue or pole bolted thereto, C the seat-beam supporting the driver's seat D, and E the braces, thus much constituting the frame-work of the harrow as in the patent aforesaid.

The gang-beams F are suitably hinged near their outer ends to the under side of the main beam, and have secured to them in the usual or any suitable manner the series of disk-gangs of the ordinary construction, with this exception. The inner hanger of one gang is provided with a forwardly-projecting arm, G, containing at its extremity a journal, in which is confined a stub-spindle carrying a forwardly-projecting single disk, H, and the inner hanger of the other gang has a similar rearwardly-extending arm, I, containing at its extremity a journal, in which is confined a stub-spindle carrying a rearwardly-projecting single disk, J. The relative position of these two disks H and J with reference to the remainder of the gangs and to each other is clearly shown in Figs. 1 and 2, and they are so disposed as that they may partially travel over the same ground, one in advance of the other, and thus fully cut and overturn the central ground, which otherwise, were they in line with their respective gangs, as is usual, either bank up the earth to form a ridge in an in-throwing harrow or leave a more or less uncut central space in an out-throwing harrow. This partial overlapping of the line of travel of the inner disks, while preferable in an out-throwing harrow, is not so essential in an in-throwing harrow, and in the latter case their relative adjustments with relation to their lines of travel may be varied as desired. Furthermore, by this forward and rearward adjustment of the inner disk of each gang clogging is prevented, and a full opportunity given the earth to clear itself around the central disks, as in those harrows where one gang is set slightly in advance of the other; but with the additional advantage in my case that the draft is rendered equal, and the disadvantage of setting one gang in advance of the other obviated.

While it is of course preferable to have two inner disks, the one set in advance and the other in the rear, as above described, yet the advantages of this feature of my invention may be obtained to a large extent by dispensing with either of these inner disks and retaining the other. The one dispensed with in such case would occupy its usual position in the gang in line with the other disks of that gang. Furthermore, the extent to which the inner disks are set in advance or in rear of the line of their respective gangs may be varied to best suit the requirements of the work to be done.

The manner of connecting the arms G and I with the gang-beams is of course a mere detail of construction—that is to say, they may either be integral with the inner hangers, as above described, or they may be separate pieces bolted or otherwise secured to the gang-beams.

While a better harrow is produced, perhaps, in one having the gang-beams adjustable forward and back, yet I do not wish to be understood as restricting the above feature of my present invention to such a harrow alone, as its advantages can be obtained in a machine having gangs of disks permanently set and not adjustable.

Upon the main beam over each of the gang-beams I secure an automatically-shifting weight, which is preferably a box, K, to contain weights, such as stone or scrap-iron, and which is supported and actuated in the following manner, reference being had more particularly to Figs. 5, 6, and 7.

Crank-arms L, one for each weight-box, are journaled vertically through the main beam, and have their upper ends adjustably secured to their respective weight-boxes. Their horizontal portions a are slotted to receive adjustable wrist-pins b, which pass down vertically through longitudinal slots in the gang-beams F, and have fitted upon them friction-rollers c, which can turn freely in the slots in the gang-beams. It will thus be seen from this construction that, supposing the weight-boxes and the gang-beams to occupy the same vertical plane when the gangs are in straight lines, when the gangs are angled the weight-boxes will be turned thereby through the turning of the cranks L, actuated by the gang-beams, and that the extent of travel of the weight-boxes may be regulated by adjusting the wrist-pins toward or from the axes of the cranks. Furthermore, for weight-boxes in an out-throwing harrow, as shown in Fig. 1, the crank-arms should be adjusted with the horizontal portions turned inward or toward each other, whereby when the gangs were angled backward the weight-boxes would be thrown far enough back, as seen in Fig. 1, to counterbalance the tendency of the machine to bear down upon the horses' necks. In an in-throwing harrow, where the gangs are angled forward, as seen in Fig. 2, this position of the crank-arms should be reversed, and the horizontal portions a should be turned outward or away from each other, thereby still causing the weight-boxes to be shifted back automatically by the angling of the gangs, as seen in Fig. 2, and to a greater extent than in an out-throwing harrow.

To decrease the friction and partially support the weight-boxes, friction-rollers may be interposed between them and the main beam, as will readily suggest itself to any skilled mechanic.

By means of the separate adjustment of the wrist-pin the proper degree of angling required for the weight-boxes may be obtained for the varying positions of anglings of the disk-gangs, and by means of the separate adjustment of the weight-boxes on their pivots or journals they may be given any position required when the gangs are in straight line, or, again, by changing the position of the weight-boxes with reference to the crank-arms, the reversing of the crank-arms for use in an in-throwing or out-throwing harrow may be obviated.

While not here seeking to claim, broadly, the application of a swinging double-tree for causing the simultaneous shifting of the gangs from a rear angle to a straight line, or from a straight line to a forward angle, my present improvement in this connection consists in such an arrangement and application of the swinging double-tree that when the gangs are angled backward, as in an out-throwing harrow, or are angled forward, as in an in-throwing harrow, at which respective points the greatest tendency exists to throw the weight of the machine upon the horses' necks, the line of draft constantly lowers as the degree of angling increases, thereby enabling the team to overcome the downward pressure of the machine with the least strain upon them—that is to say, it secures for the team by the shifting of the leverage the best possible means of overcoming the down-pressure by an up-pull. This result I accomplish in the following manner: As seen in Fig. 3, which is a side elevation of an out-throwing harrow, the swinging arm P, to which the double-tree and the links M are connected, is so connected to the pole or tongue as that it stands vertically, or substantially so, when the gangs are angled backward to their greatest angle, and thereby brings the draft-line to its lowest position, and from which position the arm P swings forward and upward in the direction of the arrow as the gangs are shifted to a straight line.

In an in-throwing harrow, as seen in Fig. 4, the arm P is so located upon the pole as that it occupies a vertical position, or substantially so, in such manner as to bring the draft-line to its lowest position when the gangs are angled forward to their greatest extent, and from which position it swings backward and upward in the direction of the arrow as the gangs approach or come to a straight line.

The hand lock-lever R, rack S, and chain or cord Q may be employed for holding the arm P in any of its adjusted positions against the resistance of the earth upon the disk-gangs, thereby holding them locked in any of their adjusted positions, and enabling the operator from his seat on the machine to change the angle of the gangs by the power of the team, as will be readily understood.

Another feature of my present invention consists in the application of carrying or transporting wheels to this class of harrows, by means of which the machine may be lifted to raise the disks from the ground when the harrow is not at work and is being transported from place to place. This is illustrated in Figs. 8, 9, 10 and 11, where I provide crank-arms T, whose inner horizontal ends may be inserted in suitable journals or boxes, U, secured upon the ends of the main beam A, and whose outer ends form stub-spindles to receive the carrying-wheels V. To hold these crank-arms down in such position as to keep the harrow lifted from the ground, I provide a stop-plate, W, which, bolted to the end of the main beam, has a curved projection forming a space, $d$, Fig. 10, between it and the end of the main beam, and with a slot, $e$, in line with the journal of the boxes U in such manner than when the cranks are turned horizontally they can be inserted into said journals and can then be turned down in the space $d$, between the projecting end of the plate W and the main beam, to form a lock. A removable pin, $f$, inserted through an aperture in the plate W in front of the crank-arm, serves to hold it from turning, as will be readily understood. By inserting the crank-arms and dropping them behind the plates W, as seen in Fig. 8, the parts are brought to such position that by raising the harrow off the ground it can be locked and held up by the insertion of a pin, as aforesaid. If it is not desired to remove the wheels V when the harrow is at work, the crank-arms may be turned up and locked behind an upward extension of the plate W, as seen in Fig. 10.

To enable wheels of any character and having hubs of different sizes to be employed, I fit a loose freely-turning sleeve, $h$, whose inner end is flared, as at $j$, upon the spindles $i$ of the crank-arms T, as seen in Fig. 10, and over which sleeve the hub of the wheel V is slipped, and is secured and centered by a tapering nut, $k$, screwed upon the outer end of the sleeve, which is threaded for that purpose.

The remaining feature of my invention consists in the construction of a novel scraper for the disks. (Represented particularly in Figs. 12, 13, and 14.) My object is to provide independent automatically-acting scrapers for the disks, which will at all times remain in operating contact to prevent the accumulation or adherence of earth upon the disks, but which, while bearing at the same time upon both sides of the disks, can yield by spring action where the accumulation is greater than usual, and which can, when desired, be locked out of engagement, as where it is desired to clean the scraper-blades, or, when the use of scrapers is not desired, in the working of the harrow. Over each disk the gang-beam is perforated horizontally to receive a bolt or screw, $l$, that passes through and supports a plate, $m$, upon the side of the beam, having projecting therefrom a short sleeve, $n$, over which is fitted and upon which is pivoted the scraper, the whole being united and held together by a nut, $o$, screwed upon the bolt $l$.

The scraper consists of two arms, $p$ and $q$, fitted together at their tops and both pivoted upon the sleeve $n$. The former carries the pivoted scraper-blade $r$, and the latter constitutes the presser-foot acting upon the convex side of the disk. The pivotal head of the arm $q$ is formed into a follower, $s$, that fits into a recess or chamber, $t$, formed in the head of the arm $p$, and containing a spiral spring, $u$, into whose outer end may be inserted a plug, $v$, that bears against the end wall of the chamber $t$. It is to be understood, of course, that the plug $v$ may be dispensed with. By means of this spring, whose tension can be adjusted, as presently explained, the arm $p$, carrying the scraper-blade, can swing from the arm $q$, or yield to permit the passage of greater than ordinary accumulations upon the disk, while at the same time the spring is strong enough to hold the blade in sufficiently firm working-contact with the disk. To set the arm $p$ to cause the scraper-blade to bear with more or less force upon the disk, I employ a set-screw, $w$, which, engaging with a shoulder or boss, $a'$, upon the arm $q$, passes therethrough and bears upon a step, $b'$, upon the extremity of the chamber $t$ of the arm $p$. By screwing down this set-screw the arms $p$ and $q$ are thrown apart, and by screwing it up they are brought together by the action of the spring $u$, as will be readily understood. To lock the arms $p$ and $q$ entirely apart to render the scraper inoperative or to clean the same, I employ a latch, $c'$, which, pivoted, as at $d'$, to the arm $q$, can, when the arms are thrown apart, engage with a stud or stop, $e'$, upon the chamber $t$, thus locking the arms in the position shown by the dotted lines in Fig. 13.

As a modification in the construction of the scraper illustrated, the arm $q$, which is represented as being turned in and inclined toward the center of the disk for the purpose of more readily permitting the passage of accumulations and of clearing itself, instead of being pivoted to the arm $p$, may be pivoted to an upward extension of the rocking scraper-blade $r$, and have interposed any suitable spring to obtain the spring or yielding action before referred to.

Having thus fully described my invention, I claim—

1. In a wheel or disk harrow, the combination, with its gangs of simultaneously backwardly and forwardly adjustable disks, of a central disk permanently located out of the lines of said gangs and movable therewith, whereby the earth at the center of the harrow is fully cut and turned and prevented from banking.

2. In a wheel or disk harrow, the combination, with its gangs of simultaneously backwardly and forwardly adjustable disks, of an inner disk permanently located in the rear of the lines of said gangs and movable therewith, whereby the earth at the center of the harrow is fully cut and turned and prevented from banking.

3. In a wheel or disk harrow, the combination, with its gangs of disks, of two inner disks, the one set in advance and the other in the rear of the line of said gangs, whereby the earth at the center of the harrow is fully cut and turned and prevented from banking.

4. In a wheel or disk harrow, the combination, with its gangs of disks, of two inner disks, the one set in advance and the other in the rear of the line of said gangs, and coupled one to each of said gangs, respectively, whereby the earth at the center of the harrow is fully cut and turned and prevented from banking.

5. In a wheel or disk harrow, the combination, with its gangs of disks, of two inner disks in advance and in rear of the line of said gangs, respectively, and set one substantially in front of the other, whereby the earth at the center of the harrow is fully cut and turned and prevented from banking.

6. In a wheel or disk harrow, the combination, with its gangs of disks, of two inner disks, one set in advance and the other in the rear of the line of said gangs, the one substantially in front of the other and coupled one to each of said gangs, respectively, whereby the earth at the center of the harrow is fully cut, turned, and prevented from banking.

7. In a wheel or disk harrow having backwardly and forwardly adjustable gangs of disks, the combination, with said gangs, of two inner disks, the one set in advance and the other in the rear of the line of said gangs, whereby the earth at the center of the harrow is fully cut, turned, and prevented from banking.

8. In a wheel or disk harrow having backwardly and forwardly adjustable gangs of disks, the combination, with said gangs, of two inner disks, the one set in advance and the other in the rear of the line of said gangs, and coupled one to each of said gangs, respectively, whereby the earth at the center of the harrow is fully cut, turned, and prevented from banking.

9. In a wheel or disk harrow having backwardly and forwardly adjustable gangs, the combination, with said gangs, of two inner disks in advance and in rear of the line of said gangs, respectively, and set one substantially in front of the other, whereby the earth at the center of the harrow is cut, turned, and prevented from banking.

10. In a wheel or disk harrow having backwardly and forwardly adjustable disk-gangs, the combination, with said gangs, of weights and connecting mechanism whereby the shifting of said gangs causes the automatic shifting of the weights to such positions as tend to balance the harrow.

11. In a wheel or disk harrow having backwardly and forwardly adjustable disk-gangs, the combination, with said gangs, of weights and adjustable connecting mechanism, whereby the shifting of said gangs causes the automatic shifting of the weights to such positions as to balance the harrow, and whereby the extent of shifting of said weights may be regulated at will.

12. In a wheel or disk harrow, the combination, with the gang-beams, the main beam, and the automatically-shifting weights, of the crank-shafts L, secured to the weights journaled in the main beam, and having their lower ends passed through slots in the gang-beams.

13. In a wheel or disk harrow, the combination, with the gang-beams, the main beam, and the automatically-shifting weights, of the crank-shafts L, rigidly secured to the weights journaled in the main beam, and having their lower ends passed through slots in the gang-beams and made adjustable therein.

14. In a wheel or disk harrow, the combination, with the gang-beams, the main beam, and the automatically-shifting weights, of the crank-shafts L, secured to the weights journaled in the main beam, and having their lower ends passed through slots in the gang-beams and provided with friction-rollers.

15. In a wheel or disk harrow, the combination, with the simultaneously backwardly and forwardly adjustable disk-gangs, of a movable double-tree, and draft-links constructed and arranged substantially as decribed, whereby when the gangs are angled the line of draft will be lowered.

16. In a wheel or disk harrow, the combination, with the simultaneously backwardly and forwardly adjustable disk-gangs, a swinging double-tree and draft-links, of a vibrating arm supporting said double-tree, constructed and arranged substantially as described, whereby, when the gangs are angled, the line of draft will be lowered.

17. In a wheel or disk harrow, the combination, with the disks, of independently-pivoted straddling-scrapers, whose two parts carrying the bearing-surfaces, one on each side of the disk, are united by yielding or spring connections.

18. A straddling harrow-scraper composed of two arms coincidently pivoted to the gang-beam, one of which arms carries or constitutes the scraper-blade, and which said arms are held together in proper relation to the disk by a yielding or spring connection.

19. A straddling harrow-scraper composed of two arms coincidently pivoted to the gang-beam, one of which arms carries or constitutes the scraper-blade, and which said arms are held together in proper relation to the disks by an adjustable yielding or spring connection.

20. A straddling harrow-scraper composed of two arms coincidently pivoted to the gang-beam, one of which arms carries or constitutes the scraper-blade, which said arms are held together in proper relation to the disks by a yielding or spring connection, and which are provided with a latch to hold the arms apart to render the scraper inoperative.

21. The herein-described harrow-scraper, composed of the arms $p$ and $q$, united to the gang-beam by a common pivot, the former of which arms carries or constitutes the scraper-blade $r$, and has a chamber, $t$, containing a spring, $u$, and the latter of which arms, $q$, has a follower, $s$, entering said chamber and bearing against said spring, the set-screw $w$, engaging with the arm $q$, and bearing upon the chamber $t$ of the arm $p$, the latch $c'$, and stops $e'$ upon the chamber $t$, substantially as and for the purpose specified.

E. FOWLER STODDARD.

Witnesses:
E. W. RECTOR,
OTTO RICHTER.